United States Patent
Deal et al.

(10) Patent No.: US 10,847,126 B2
(45) Date of Patent: Nov. 24, 2020

(54) HANDS-FREE VIBRAPHONE MODULATOR

(71) Applicant: Indiana University Research and Technology Corporation, Indianapolis, IN (US)

(72) Inventors: W. Scott Deal, Indianapolis, IN (US); Kevin David Galler, Indianapolis, IN (US); Maher Rizkalla, Carmel, IN (US); Paul Salama, Indianapolis, IN (US)

(73) Assignee: Indiana University Research and Technology Corporation, Indianapolis, IN (US)

( * ) Notice: Subject to any disclaimer, the term of this patent is extended or adjusted under 35 U.S.C. 154(b) by 434 days.

(21) Appl. No.: 15/927,736

(22) Filed: Mar. 21, 2018

(65) Prior Publication Data

US 2018/0277071 A1    Sep. 27, 2018

Related U.S. Application Data

(60) Provisional application No. 62/475,461, filed on Mar. 23, 2017.

(51) Int. Cl.

| G10D 13/09 | (2020.01) |
|---|---|
| H02P 7/00 | (2016.01) |
| G10H 1/055 | (2006.01) |
| G10H 1/02 | (2006.01) |
| G10H 1/047 | (2006.01) |

(52) U.S. Cl.
CPC ............... *G10D 13/09* (2020.02); *G10H 1/02* (2013.01); *G10H 1/047* (2013.01); *G10H 1/0553* (2013.01); *H02P 7/00* (2013.01); *G10H 2220/415* (2013.01); *G10H 2220/455* (2013.01)

(58) Field of Classification Search
CPC .......... G10D 13/09; G10H 1/02; G10H 1/047; G10H 1/0553; G10H 2220/415; G10H 2220/455; H02P 7/00
See application file for complete search history.

(56) References Cited

U.S. PATENT DOCUMENTS

| 7,446,248 B2 * | 11/2008 | Skinn | G10G 7/02 |
|---|---|---|---|
| | | | 84/312 R |
| 2008/0092720 A1 * | 4/2008 | Yamashita | G10C 3/00 |
| | | | 84/600 |
| 2012/0152087 A1 * | 6/2012 | Sakazaki | G10H 1/0008 |
| | | | 84/600 |
| 2012/0240748 A1 * | 9/2012 | Endow | G10D 13/08 |
| | | | 84/433 |

* cited by examiner

*Primary Examiner* — Zoheb S Imtiaz
(74) *Attorney, Agent, or Firm* — Faegre Drinker Biddle & Reath LLP

(57) ABSTRACT

A motor control system is provided for controlling a speed of a motor system used in a musical instrument. The motor control system includes at least one sensing device attached to the musical instrument, and configured for detecting movement of an object and providing a sensor signal based on the movement of the object. Also included in the motor control system is a control unit having a processor connected to the motor system and the at least one sensing device. The control unit is configured for selectively modulating the speed of the motor system based on the sensor signal.

18 Claims, 5 Drawing Sheets

HANDS-FREE VIBRAPHONE MODULATOR

RELATED APPLICATIONS

This application claims the benefit of U.S. Provisional Application Ser. No. 62/475,461, filed on Mar. 23, 2017, titled HANDS-FREE VIBRAPHONE MODULATOR, the disclosure of which is expressly incorporated by reference herein.

FIELD OF THE DISCLOSURE

The present disclosure generally relates to motor control systems and methods. More particularly, the present disclosure relates to systems and methods for modulating a speed of a motor used with a vibraphone.

BACKGROUND OF THE DISCLOSURE

Conventional vibraphones include between three and four octaves of aluminum bars arranged in a diatonic keyboard fashion. Typically, the bars, which ring clearly when struck, are dampened with a pedal, much in the same way that one dampens strings of a piano. Most percussion keyboard instruments, such as a xylophone, marimba, and bells, have resonating tubes underneath each bar for magnifying resonance of the sounded bars, but do not vibrate enough to have a modulating motor to induce vibrato. As for the vibraphones, an electric motor-controlled device is included for rotating caps over resonators to give the sound a vibrato or tremolo effect. A speed of a motor used in the vibraphone is variable, and the tremolo effect can sound in a range of speeds from slow to fast. The motor may be operated via either a turning knob or sliding fader located underneath the vibraphone bars.

However, controlling the motor requires movement that is not part of playing the vibraphone. For example, to modulate the speed of the motor, a player needs to stop using her or his hand to play the vibraphone, which creates an unwanted situation where performing with one hand must be entirely stopped because the player may hold up to two 15-inch weighted mallets in each hand during musical performance. Consequently, the motor speed is generally only changed during periods of time when the player is not playing the vibraphone with one of the player's hands. Although a manual foot pedal mechanism may be used to modulate the motor speed, the foot pedal mechanism can interfere with the player's feet and legs for performing other functions, such as with operation of the dampening pedal.

As such, there are opportunities to develop an improved system and method for automatically modulating the motor speed without interfering with the musical performance.

SUMMARY

In one embodiment of the present disclosure, a motor control system is provided for controlling a speed of a motor system used in a musical instrument. The motor control system includes at least one sensing device attached to the musical instrument, and configured for detecting movement of an object and generating a sensor signal from the at least one sensing device based on the movement of the object. A control unit has a processor connected to the motor system and the at least one sensing device, and is configured for selectively modulating the speed of the motor system based on the sensor signal.

Motor control system provides an enhanced control function for adjusting the operating parameters to modulate the motor speed using various modules and other related systems. In one embodiment, it is contemplated that motor control system and method is provided for automatically monitoring and adjusting the operating parameters.

Also included in the present disclosure is a system and method configured for monitoring patterns of operating parameter variations during a predetermined time period based on historical information of a comparative logic or algorithm. Further, motor control system provides displays regarding and relationships among the operating parameters in real time. Additionally, the operating parameters are adjusted and regulated automatically without substantial manual interruptions. As a result, the overall response time of the motor systems is reduced, and thus motor control system or method improves a musical performance experience.

In one aspect of the present disclosure, the at least one sensing device includes at least one of: a motion-detecting camera, an infra-red sensor, an ultrasound sensor, a motion-tracking camera, and a motion-capturing sensor.

In another aspect, the control unit further comprises a signal detection and calibration unit configured for detecting the sensor signal from the at least one sensing device, and providing movement condition information about the object.

In yet another aspect, the control unit further comprises a distance estimation unit configured for estimating a distance between a corresponding sensing device and the object based on the sensor signal.

In still another aspect, the control unit further comprises a signal tracking unit configured for tracking the sensor signal to monitor the movement of the object during a predetermined time period.

In yet still another aspect, the control unit further comprises a signal interpretation profile adjustment unit configured for interpret the sensor signal based on a signal interpretation profile. In a variation, the control unit further comprises a motor speed modulation unit configured for generating a motor signal for modulating the speed of the motor system by converting the sensor signal based on the signal interpretation profile. In another variation, the control unit further comprises a motor activation unit configured for activating the motor system based on the motor signal, and modulating the speed of the motor system based on the motor signal.

In another embodiment of the present disclosure, a method of controlling a speed of a motor system used in a musical instrument is provided. The method includes detecting movement of an object, using at least one sensing device attached to the musical instrument, generating a sensor signal from the at least one sensing device based on the movement of the object, and selectively modulating, using a control unit having a processor connected to the motor system and the at least one sensing device, the speed of the motor system based on the sensor signal.

In one aspect of the present disclosure, the method further includes interpreting a relationship associated with at least one of: a distance between the object and the at least one sensing device, and a speed of the object, the relationship being interpreted based on a voltage level of the sensor signal. In a variation, interpreting the relationship comprises estimating the distance between the object and the at least one sensing device based on the voltage level of the sensor signal.

In another aspect, the method further includes detecting the sensor signal from the at least one sensing device and providing movement condition information about the object relative to the at least one sensing device. In a variation, detecting the sensor signal comprises tracking the sensor signal for monitoring the movement condition information of the object during a predetermined time period to evaluate change information of the movement condition. In another variation, tracking the sensor signal comprises calculating a sensor signal strength based on the tracked sensor signal with respect to the change information using the voltage level of the sensor signal.

In yet another aspect, the method further includes generating a motor signal for modulating the speed of the motor system by converting the sensor signal based on a signal interpretation profile. In a variation, generating the motor signal comprises activating the motor system based on the motor signal, and modulating the speed of the motor system based on the motor signal.

In yet another embodiment of the present disclosure, a method of controlling a speed of a motor system used in a musical instrument is disclosed. The method includes detecting movement of an object, using at least one sensing device attached to the musical instrument, generating a sensor signal from the at least one sensing device based on the movement of the object, generating a signal interpretation profile having movement condition information associated with the object based on a voltage level of the sensor signal, and selectively modulating, using a control unit having a processor connected to the motor system and the at least one sensing device, the speed of the motor system based on the signal interpretation profile.

In one aspect of the present disclosure, the method further includes adjusting the speed of the motor system based on a sensor signal strength of the sensor signal with respect to the signal interpretation profile. In a variation, adjusting the speed of the motor system comprises adjusting the signal interpretation profile to modify at least one of: a range of the at least one sensing device, the sensor signal strength of the sensor signal, and the speed of the motor system.

In another aspect of the present disclosure, the method further includes converting the sensor signal based on the signal interpretation profile and generating a motor signal for modulating the speed of the motor system.

Additional features and advantages of the present disclosure will become apparent to those skilled in the art upon consideration of the following detailed description of the illustrative embodiments.

BRIEF DESCRIPTION OF THE DRAWINGS

The embodiments will be more readily understood in view of the following description when accompanied by the below figures and wherein like reference numerals represent like elements, wherein.

Figure 1:
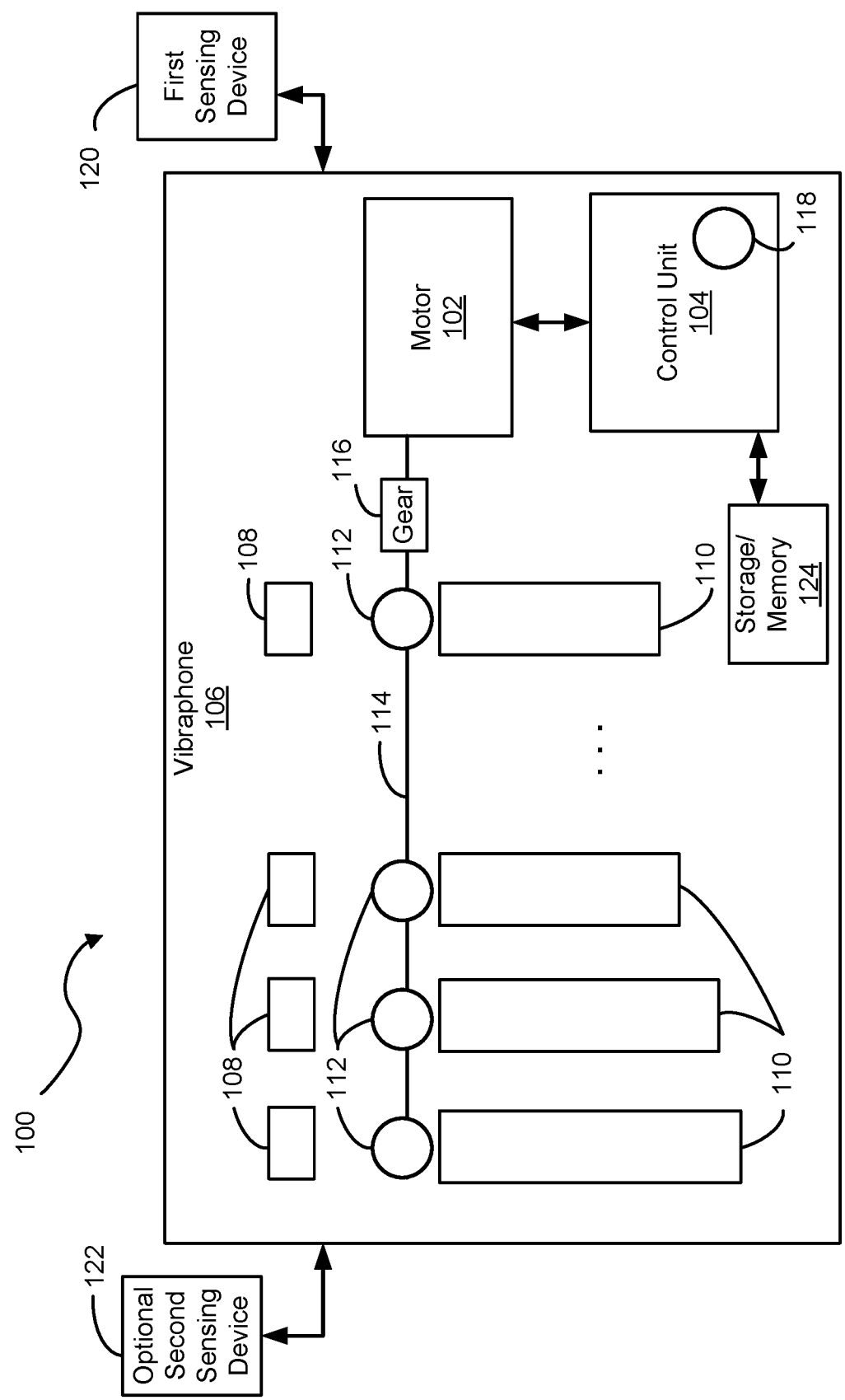
FIG. 1 illustrates an exemplary visualization of motor control system featuring a control unit.

Corresponding reference characters indicate corresponding parts throughout the several views. Although the drawings represent embodiments of the present disclosure, the drawings are not necessarily to scale and certain features may be exaggerated in order to better illustrate and explain the present disclosure. The exemplifications set out herein illustrate an exemplary embodiment of the disclosure, in one form, and such exemplifications are not to be construed as limiting the scope of the disclosure in any manner.

DETAILED DESCRIPTION OF EMBODIMENTS

Embodiments of the present disclosure are described below by way of example only, with reference to the accompanying drawings. Further, the following description is merely exemplary in nature and is in no way intended to limit the disclosure, its application, or uses. As used herein, the term "module" or "unit" may refer to, be part of, or include an Application Specific Integrated Circuit (ASIC), an electronic circuit, a processor or microprocessor (shared, dedicated, or group) and/or memory (shared, dedicated, or group) that executes one or more software or firmware programs, a combinational logic circuit, and/or other suitable components that provide the described functionality. Thus, while this disclosure includes particular examples and arrangements of the modules, the scope of the present system should not be so limited since other modifications will become apparent to the skilled practitioner.

Referring now to FIG. 1, a motor control system is generally designated 100, and is designed to provide an efficient way to control at least one motor system 102 connected to a control unit 104 used in a musical instrument 106, such as a vibraphone. Included in the vibraphone 106 are a plurality of chromatically tuned steel bars 108 and a plurality of corresponding resonator tubes 110. While the motor system 102 and the control unit 104 are shown separately for illustration purposes, both can be integrated as a single modular unit, as a stand-alone component.

For each resonator tube 110, a modulating cap 112 is disposed near an upper edge of the respective resonator tube, and is connected to a motorized spindle 114 being powered by the motor system 102 via a gear box 116. When the motor system 102 is switched on, the spindle 114 periodically rotates to simultaneously open and close the plurality of resonator tubes 110 during musical performance.

In use, an air column within each resonator tube 110 moves, and an alternate increase and decrease in a pitch of a note is generated (e.g., a vibrato effect). A rotation speed of the spindle 114 is adjustable by a turning knob 118 in the control unit 104 and may range from about zero to 12 rotations per second. Other suitable arrangements of the vibraphone 102 and vibrato effects are contemplated to suit different configurations.

One aspect of motor control system 100 is that at least one sensing device 120, 122 is used to feed data to data processing and machine learning (ML) algorithms that control the motor system 102 attached to the vibraphone 106. As discussed below, motor system 102 rotates modulating caps 112 over resonator tubes 110 of vibraphone 106, creating a distinct aural resonance. Thus, motor control system 100 enables users (e.g., musicians) to alter a speed of motor system 102 without having to stop playing in order to turn the knob 118 as is described below.

By providing a hands-free device to modulate the speed of motor system 102 on vibraphone 106, the users are empowered to explore entirely new expressive musical territory. It is therefore beneficial that motor control system 100 creates a highly accurate and simple to operate gesture sensor-controller that will be used for nuanced body movements as they relate to setting a function of a motor 102.

Motor control system 100 may be used not only in musical applications, but also in other suitable areas, such as medical assistance, automotive engineering, and virtual reality applications. While various applications are contemplated for motor control system 100, an exemplary use shown herein relates to a gesture sensor-controller that modulates the speed of motor system 102 installed in the vibraphone 106. The present disclosure is not intended to be limited to this application.

In one embodiment, a first sensing device 120 is operatively connected to control unit 104, and an optional second sensing device 122 (FIG. 2) is also operatively connected to control unit 104. Sensing devices 120, 122 are configured for detecting movement of an object, such as a hand of the user. In one embodiment, first sensing device 120 may be disposed near a top portion of a right side (or a left side) of vibraphone 106. In another embodiment, second sensing device 122 may be disposed near the top portion of an opposite side of vibraphone 106 for enabling the user to access at least one of sensing devices 120, 122 from either end of vibraphone 106.

Exemplary first and second sensing devices 120, 122 may include, but are not limited to, motion-detecting cameras and infra-red sensors. Other suitable sensors, such as an ultrasound sensor, a motion-tracking camera or a motion capture sensor, are also contemplated to suit different applications. Based on a degree of at least one of: proximity, range, movement direction, type of motion, or speed of the object, sensing devices 120, 122 provide sensor signals to the control unit 104 which selectively modulate the speed of the motor system 102 in response to the sensor signals in the manner described below.

Figure 2:
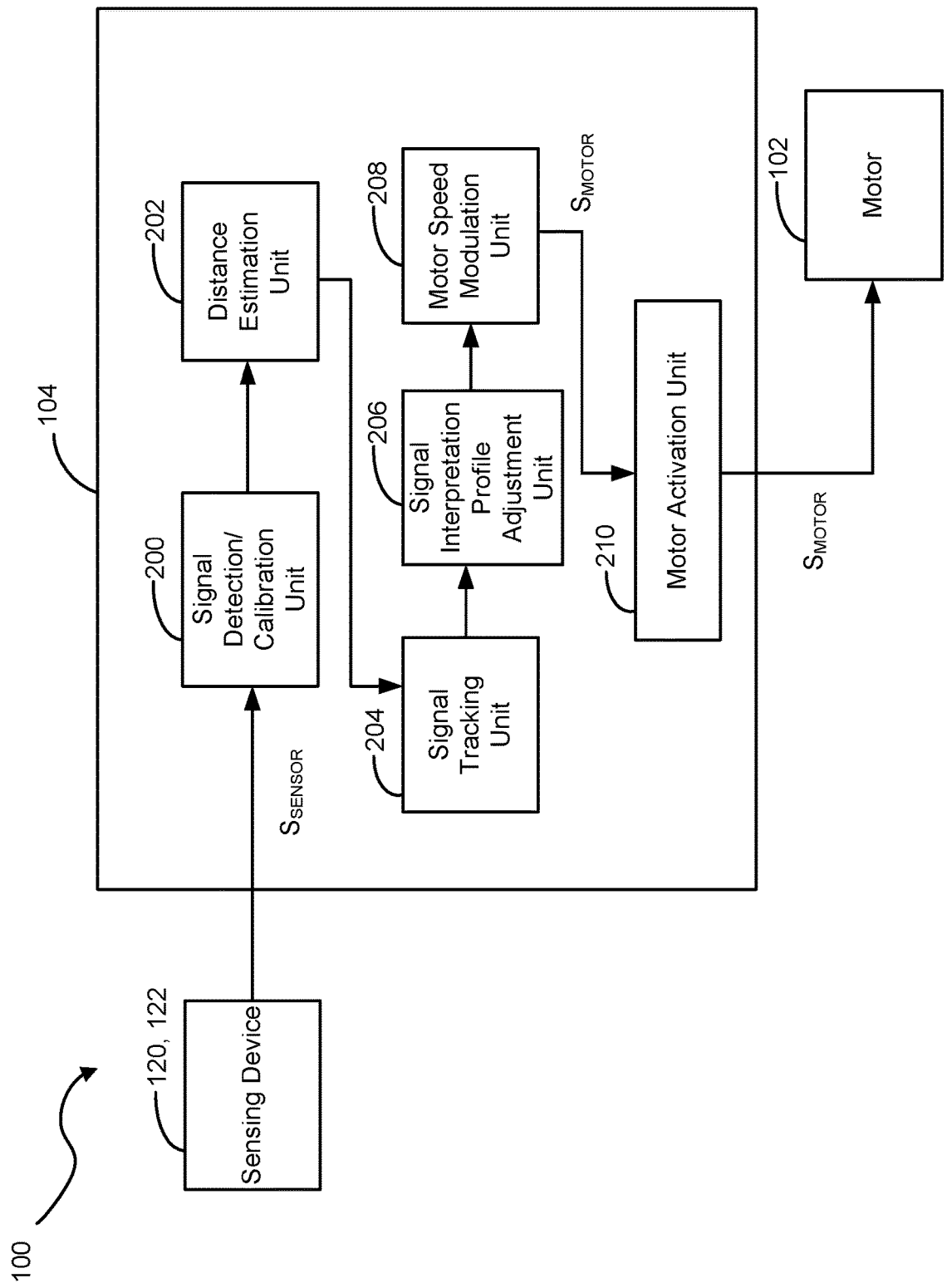
FIG. 2 is a functional block diagram of motor control system, featuring children units of the control unit of FIG. 1.

Referring now to FIGS. 1 and 2, in one embodiment, motor control system 100 includes control unit 104 having a signal detection and calibration unit 200, a distance estimation unit 202, a signal tracking unit 204, a signal interpretation profile adjustment unit 206, a motor speed modulation unit 208, and a motor activation unit 210. Although these sub-units 200, 202, 204, 206, 208, 210 are illustrated as children units subordinate of parent control unit 104, each sub-unit can be operated as a separate unit from the control unit, and other suitable combinations of sub-units are contemplated to suit different applications.

All relevant information can be stored in memory or storage device 124 (FIG. 1), e.g., a non-transitory data storage device and/or a machine readable data storage medium carrying computer-executable instructions, for retrieval by control unit 104 and its children units. Other devices, services, and applications may include, but are not limited to, one or more software or hardware components, etc., related to control unit 104. Control unit 104 also receives a sensor signal $S_{SENSOR}$ having operating data or parameters from sensing devices 120, 122 or the related systems, which are communicated to the children units.

More specifically, signal detection and calibration unit 200 is configured to detect the sensor signal $S_{SENSOR}$ from at least one sensing device 120, 122, and provide movement condition or status information about an object, such the user's hand, in range of motor system 102 or the sensing device. In certain embodiments, signal detection and calibration unit 200 determines detailed information of the movement condition or status of the object, such as a location, speed, or direction of the object, using the sensor signals from sensing devices 120, 122.

Further, signal detection and calibration unit 200 is configured to calibrate the sensor signal $S_{SENSOR}$ in such a way that only a single sensor signal is received at any given moment, either from first sensing device 120 or second sensing device 122, as desired. The software system activates the proper sensor for the proper signal fed to the motor. In other embodiments, one or more sensor signals may be received from a plurality of sensors for comparison and selection purposes to suit different applications.

Distance estimation unit 202 is configured to estimate a distance between corresponding sensing device 120, 122 and the object based on the sensor signal $S_{SENSOR}$. For example, the user waves or places her or his hand within a detection range of the sensing device 120, and moves across the detection range of sensing device 120 or vertically (upwardly/downwardly) within the detection range. Distance estimation unit 202 receives the sensor signal $S_{SENSOR}$ including the movement condition or status of the hand from the signal detection and calibration unit 200, and estimates the distance between sensing device 120, 122 and the hand.

Signal tracking unit 204 is configured to track the sensor signal $S_{SENSOR}$ for monitoring the movement condition or status of the object during a predetermined time period to evaluate trend or change information of the movement condition or status. Also, the signal tracking unit 204 is configured to track movement of the hand based on the tracked sensor signal. For example, while the user changes a position of the hand between a far position (e.g., one meter from sensing device) and a near position (e.g., four centimeters from the sensing device), signal tracking unit 204 monitors the trend or change of the location of the hand during the predetermined time period. A signal amplitude level is inversely proportional with a distance of the hand from sensing device 120, 122. Signal strength may be estimated from device models within the software.

In one embodiment, sensing device 120, 122 may output a voltage based upon how close or far an object is to the sensing device. For example, a high voltage level indicates an object is close, while a lower voltage level indicates that the object is far away. Signal tracking unit 204 is configured to estimate the distance that the object is away based on prior knowledge of how the sensor's voltage levels correspond to various distances. The changes in position are proportional to changes in the sensor signal. Tracking these changes allows signal tracking unit 204 to track various aspects of the motion or movement of the hand, such as the distance. In another embodiment, signal tracking unit 204 tracks the motion through a change in the input signal that is related to the motion based on the sensing medium. For example, if a camera is used as the sensing device, signal tracking unit 204 monitors a change between subsequent images to track the motion. The sensor signal may be image frames, and the change in each frame is tracked because it would be related to the motion of the hand.

Signal interpretation profile adjustment unit 206 is configured to interpret the sensor signal $S_{SENSOR}$ received from signal tracking unit 204 based on a signal interpretation profile. It is contemplated that the signal interpretation profile includes information about how to interpret the sensor signal $S_{SENSOR}$ based on the trend or change information of the movement condition or status of the object. For example, when the user's hand is moving away from sensing device 120, signal interpretation profile adjustment unit 206 may interpret this movement as an increase of a motor speed for motor system 102 if the information in the signal interpretation profile instructs as such.

However, if the information in the signal interpretation profile instructs otherwise, signal interpretation profile adjustment unit 206 may interpret this movement as a decrease of the motor speed instead of an increase of the motor speed. The signal interpretation profile may be adjustable or programmable by a user according to principles known to a person skilled in the art. Other operating parameters related to at least one of: signal strength, proximity, range, movement direction, type of motion, or speed of the object may also be used by signal interpretation profile adjustment unit 206 according to adjustable or programmable rules to interpret the sensor signal based on the trend or change information of the movement condition or status of the object.

Motor speed modulation unit 208 is configured to generate a motor signal $S_{MOTOR}$ for modulating the motor speed of motor system 102 by converting the sensor signal $S_{SENSOR}$ based on the signal interpretation profile. For example, the motor signal $S_{MOTOR}$ is created by motor speed modulation unit 208 to instruct motor system 102 to increase the motor speed when the user's hand is moving away from sensing device 120. As another example, the motor signal $S_{MOTOR}$ is created by motor speed modulation unit 208 to instruct motor system 102 to decrease the motor speed when the user's hand is moving closer to sensing device 120. Other variations are also contemplated to suit different applications based on the proximity, range, movement direction, type of motion, or speed of the object.

Motor activation unit 210 is configured to activate motor system 102 based on the motor signal $S_{MOTOR}$ received from motor speed modulation unit 208, and modulate the motor speed of motor system 102 based on the motor signal $S_{MOTOR}$. For example, the motor signal $S_{MOTOR}$ may be converted into an analog voltage signal and transmitted to motor system 102 for actuating a motor, such as a DC motor, and modulating its speed. An exemplary application of motor control system 100 is described below in paragraphs relating to FIGS. 4 and 5.

Figure 3:
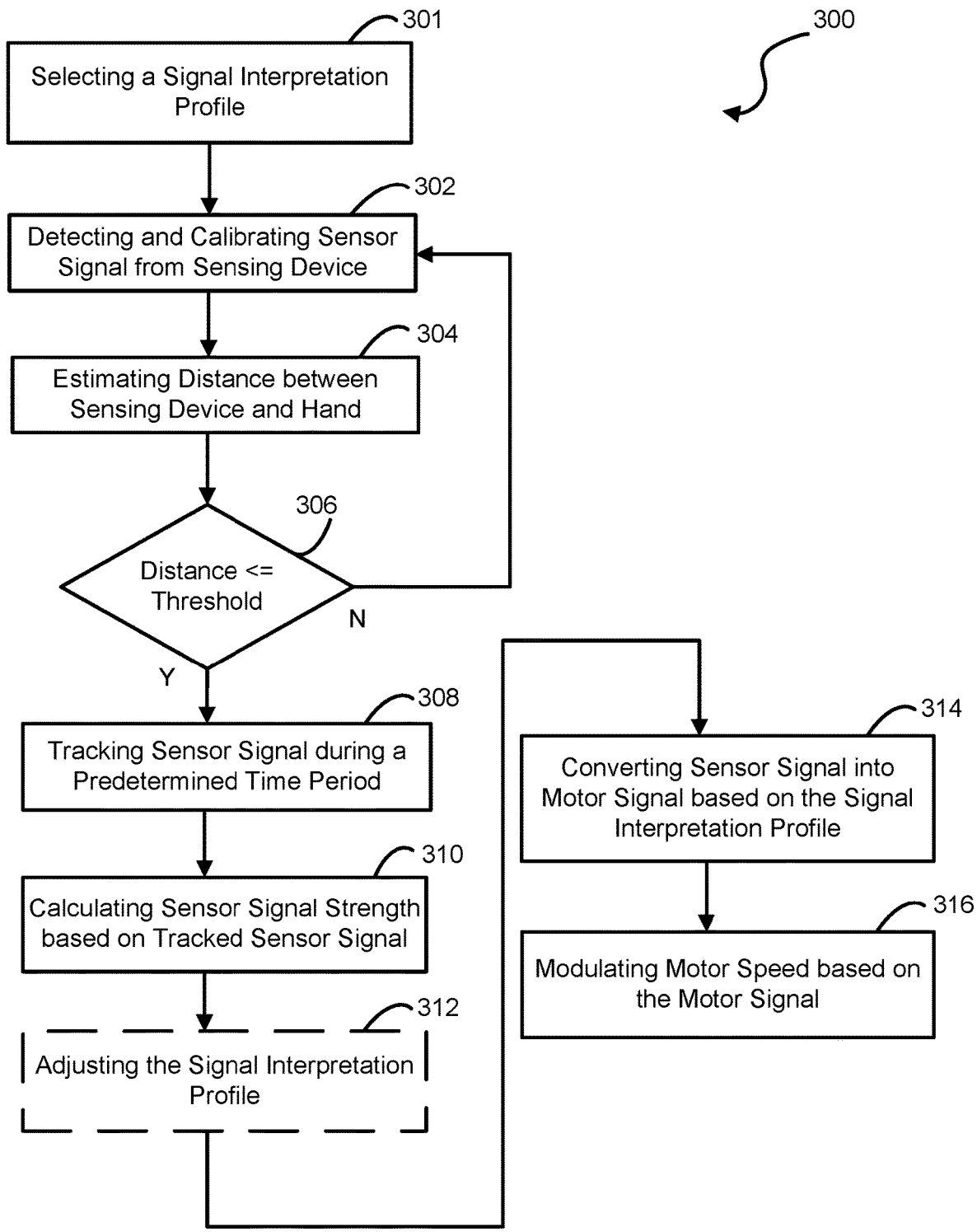
FIG. 3 is a flow chart of an exemplary method of executing motor control system.

Referring now to FIG. 3, an exemplary method or process 300 of executing motor control system 100 is illustrated. Although the following steps are primarily described with respect to the embodiments of FIGS. 1-2, it should be understood that the steps within the method may be modified and executed in a different order or sequence without altering the principles of the present disclosure.

In step 301, signal interpretation profile adjustment unit 206 may generate and initially select a predetermined signal interpretation profile. Optionally, the predetermined profile may be selected by a user, but the selected profile will not be dynamically changed based on user input. During operation, when the voltage level is measured, the voltage level relates to the distance between the hand and the sensing device, and also relates to the speed of the hand via the predetermined signal interpretation profile. In one example, the profile is a graphical representation of the distance and the speed that describes a relationship between the distance and the speed with respect to the voltage level by mapping the voltage to the distance.

In step 302, signal detection and calibration unit 200 detects the sensor signal $S_{SENSOR}$ from at least one sensing device 120, 122, and provides movement condition or status information about the object in proximity to the sensing device. Also, signal detection and calibration unit 200 calibrates the sensor signal $S_{SENSOR}$ in such a way that only a single sensor signal is received at any given moment. In another embodiment, however, signal detection and calibration unit 200 may receive the sensor signals from a plurality of sensing devices (e.g., an array of IR sensors) to suit different applications.

In step 304, distance estimation unit 202 estimates a distance between corresponding sensing device 120, 122 and the object. In step 306, when the distance is less than or equal to a predetermined threshold value, control proceeds to step 308. Otherwise, control returns to step 302. In one embodiment, distance estimation unit 202 constantly searches for an object. For example, if an object comes within a line of sight of the sensors, the unit makes a decision whether or not to react based on a software flow diagram shown in FIG. 5. However, if distance estimation unit 202 has decided that there is an object in the line of sight and it meets a latching condition to allow for a change in the speed, there is no maximum distance where it stops listening. In fact, distance estimation unit 202 may still react to objects over a predetermined distance threshold (e.g., 1 meter away) but the profiles may be chosen such that the reaction is so minor that it is impossible for a player to notice the changes at a distance of over 1 meter. Distance estimation unit 202 may still search for the hand to be removed in order to latch in a motor speed again, but it may be so far away that the motion no longer effects the operation of the motor. However, it may affect the operation of the motor where a hold point for latching is.

In step 308, signal tracking unit 204 tracks the sensor signal $S_{SENSOR}$ for monitoring the movement condition or status of the object during a predetermined time period to evaluate a trend or change information of the movement condition or status. In step 310, signal tracking unit 204 is configured to calculate a sensor signal strength based on the tracked sensor signal. For example, speed changes are dependent on the distance that the object is away from the sensor. In one embodiment, the voltage level corresponds to the distance, which motor system 102 relates to a desired speed of the motor. The strength of the signal may indicate how much noise is in a signal path. The voltage level output by sensing devices 120, 122 is measured for relating to the distance through various models. This distance that the models predict is then mapped to the various profiles to determine the desired speed at that distance. In one embodiment, the signal interpretation profile may provide information about how to adjust the motor speed based on the sensor signal strength.

In step 312, signal interpretation profile adjustment unit 206 may optionally adjust the signal interpretation profile, as desired. For example, the user may be allowed to tune the reaction of the present system to what he or she desires. Further, additional modifications in the software may lead to system adjustment for the range, signal strength, and motor speed.

In step 314, motor speed modulation unit 208 generates the motor signal $S_{MOTOR}$ for modulating the motor speed of motor system 102 by converting the sensor signal $S_{SENSOR}$ based on the signal interpretation profile. In step 316, motor activation unit 210 activates the motor system 102 based on the motor signal $S_{MOTOR}$ received from motor speed modulation unit 208, and modulates speed of the motor system 102 based on the motor signal $S_{MOTOR}$.

Figure 4:
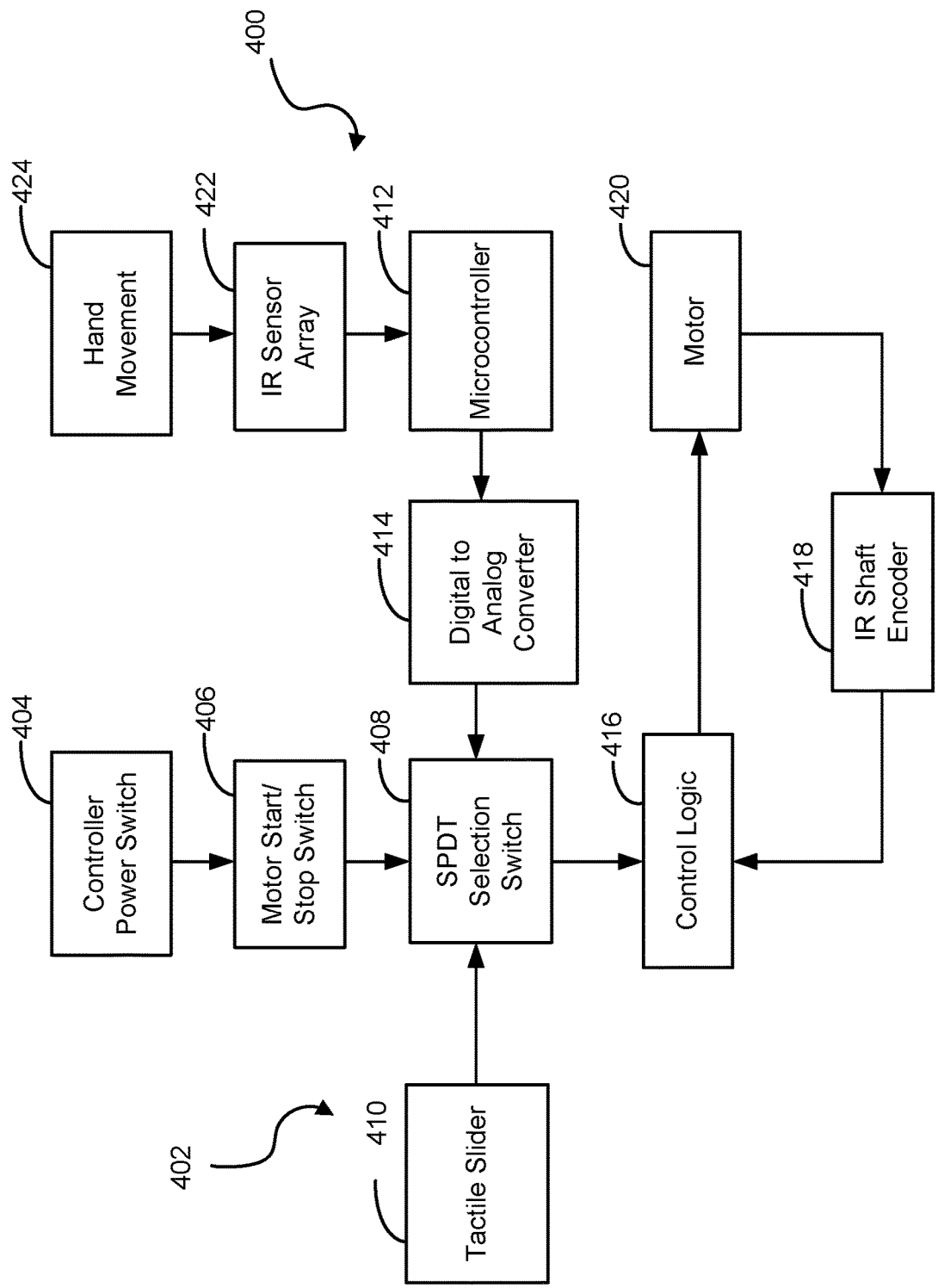
FIG. 4 is a functional block diagram of motor control system, featuring a selection switch unit.

Referring now to FIG. 4, an exemplary application 400 of motor control system 100 is shown. As described below, it is advantageous that motor control system 100 may be compatible with and/or be integrated with conventional vibraphone motor systems. Thus, motor control system 100 allows the user, such as a manufacturer or consumer, an ability to preserve the existing familiar interface of the conventional vibraphone motor system while simultaneously providing the benefits of the present system. Further, a simple installation method enables the user to augment existing vibraphones (e.g., a motor controller) without reliance on the manufacturer or specialized labor.

A combination of a hands-free mode 400 of motor control system 100 and a manual mode 402 of the conventional motor control system is illustrated in FIG. 4. In one embodiment, both modes 400, 402 may be combined together as shown. FIG. 4 shows a system block diagram including a controller power switch 404, a motor start/stop switch 406, a single pole dual throw (SPDT) selection switch 408, a tactile slider 410, a microcontroller 412, a digital to analog converter 414, control logic 416, an infrared red (IR) shaft encoder 418, and a motor 420, all of which may be part of a motor controller housing. A sensor array 422 is then connected to the microcontroller 412 through an auxiliary cable or wirelessly.

For example, the connection between sensor array 422 and microcontroller 412 may be achieved by a Wi-Fi access, a Bluetooth connection, a Near Field Communication link, a Radio Frequency Connection link, a ZigBee connection, and the like. Other suitable wireless communication methods are also contemplated, such as different types of area networks.

This configuration applied to the motor controller therefore enables the user to select an input control source, either standard tactile method 402, or hands free method 400 enabled by motor control system 100. This design allows manufacturers and consumers alike, the ability to preserve the existing familiar interface while simultaneously providing the benefits of motor control system 100. When engaged, these modifications allow system 100 to interrupt the control signals provided by the existing vibraphone controller and provide the control signals corresponding to the position and/or movement 424 of the player's hands.

Various sensor options are contemplated. Sensors 422 may be infrared light sensors. Other suitable sensors, such as ultrasonic sensor, RF sensors, magnetic sensor, cameras, gyroscopes, accelerometers, GPS sensors, and the like, are also contemplated to suit the application. These sensors provide sufficient accuracy, noise resistance, and responsiveness to allow motor control system 100 to perform effectively. During operation, noise or interference filters, and data processing algorithms, relating to the acquisition of accurate sensor readings, and mapping of input signals to the desired output response are developed. Current vibraphone motor controller 412 allows motor control system's hands free input to be used to control the motor 420.

The data processing algorithms are refined and optimized by system 100 to produce a response that is desired by the end user. This response may be carefully defined through end user testing and feedback. Further, optimizations to the initial data processing algorithm may make use of machine learning theory and linear regression models to improve the accuracy and responsiveness of motor control system 100.

Motor control system 100 is designed with emphasis on the end user's experience during interaction with the device, such as vibraphone 106. It is contemplated that a vertical motion over sensor array 422 may be one method for controlling motor control system 100. However, other various types of motion or movement (e.g., horizontal, diagonal, twisting, winding motions and the like) are contemplated to suit different applications. This method allows for high noise resistance to unintentional stimuli, as the sensing mechanism is isolated from the regular motion associated with playing the instrument. The user then activates motor control system 100 by moving his or her hand within the vertical beam projected by motor control system's sensor array.

In one embodiment, motor control system 100 may include three main components, such as a vibraphone motor controller, a vibraphone motor, and a sensor array. The augmentations to the motor controller's internal circuitry to allow for control through the sensors may be disposed within the original vibraphone motor controller housing. Modifications to the original housing may include an extra port for connection and communication with the sensor array, as well as the addition of a selection switch 408, such as a single pole dual throw (SPDT) toggle switch.

A method of detecting hand placement and removal 424 may be performed for operation of motor control system 100. This method allows motor control systems 100 to latch in a motor speed set by the user, or unlatch when a change in speed is desired. However, due to a low sampling rate of sensors 422 in use, conventional methods of transient detection in the frequency domain may be unable to be utilized due to a delay incurred from acquiring a window of samples to analyze.

Motor control system 100 may use the derivative, or rate of change, of the input data stream to detect the user's hand. In some embodiments, motor control system 100 may use a Machine Learning and Classification/Detection Theory to suit the application. When the hand is placed within, or removed from the sensor array's line of sight, a sudden change in the data stream may be seen. This sudden change then may trigger system 100 to latch in the last value on hand removal, or start changing again on hand placement.

Modification of control logic 416 to allow hands-free input may be another major advantage of motor control system 100. For example, shaft encoder 418, located inside the motor housing, monitors a fringe mounted around the rotation axis of motor 420. This fringe may have slots placed within it so that infrared light may pass through. As motor 420 rotates and these slots allow light to pass through, encoder 418 produces an electrical reaction. For example, in an infrared shaft encoder, an IR transmitter transmits infrared light. When a slot allows this light to be projected on an IR receiver, it generates a voltage pulse with a width of time period during which the light is received. When a shaft rotates, each slot sequentially allows the light to pass through and it generates a pulse train as a feedback signal given to the speed controller.

As the speed of the motor increases, the number of pulses seen per specified time unit increases. This information then is sent from the motor housing back to control logic 416 so that it may be used as feedback to accurately apply the required signals necessary to maintain the desired motor speed. When control logic 416 receives this information, a required adjustment to a control voltage is made in reference to a variable voltage provided by manual interface 402. This manual interface takes the form of an adjustable slider.

When the user selects to use motor control system 100, a standard control voltage coming from tactile slider 410 may be overridden, and may be instead provided from sensor array 422. Motor control system 100, after filtering and data processing, outputs an analog voltage between X and Y volts, for example, in the range of 0 to 3.3 volts, wherein 0 volts corresponds to the hand being far from the sensor array 422, or '10' on the slider 410, and 3.3 volts corresponds to the hand being close to the array, or '0' on the slider. In one embodiment, this voltage range is then inversely related and rescaled between U and V volts in order to control the motor speed, for example, 7.42 and 4.67 volts through a voltage conversion circuit. When the motor controller detects a change from X to U volts, the motor spins faster than a previous motor speed. However, when the motor controller detects a change from Y to V volts, the motor spins slower than the previous motor speed. In this example, a low voltage corresponds to a faster speed and a high voltage corresponds to a slower speed, but other suitable arrangements are also contemplated.

Figure 5:
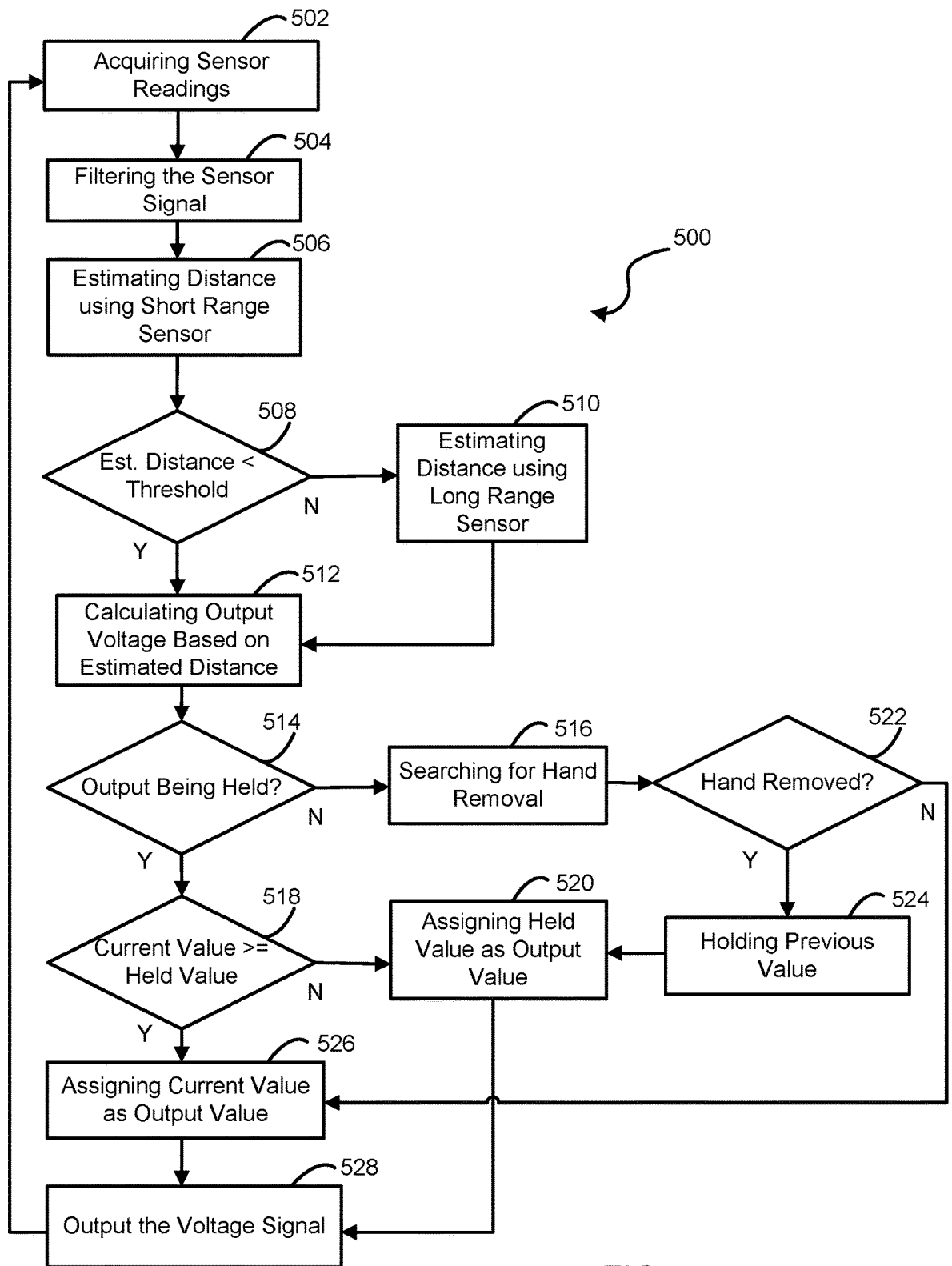
FIG. 5 is a flow chart of an exemplary method of executing motor control system using a plurality of sensing devices with multiple ranges.

Referring now to FIG. 5, an exemplary method 500 is shown of executing motor control system 100 using a plurality of sensing devices with multiple ranges. In this example, motor control system 100 may be combined into a unified system that demonstrates an ability to obtain input from the performer's hand motions and controls the vibraphone motor accordingly. The user is able to remove the hand from the line of sight of sensor array 422 to latch in a desired value, as well as place the hand at a similar height to re-engage further changes. Features of system 100 shown in FIG. 5 include: allowing the user to control the present system in a more intuitive manner; providing a way to tune the response of the system to various inputs; and making the hand removal and placement detection more responsive.

In an effort to increase a detection range of system 100, two long-range sensors may be added to sensor array 422. This allows sensor array 422 to respond to inputs further from the array. In one embodiment, system 100 may perform an initialization process and acquire the readings from sensors 422 in step 502, filter the readings to remove or reduce noise or interference signals in step 504, and output them directly to microcontroller 412.

This is because an overlapping sensing range of each sensor type may be in conflict. That is to say, each type of sensor is designed to sense inputs in a particular range (e.g., short, medium, or long range). An exemplary range of the short-range sensor is approximately 4 centimeters, and an exemplary range of the long-range sensor is approximately 1 meter.

For example, while a short-range sensor reading of 2 volts may correspond to 15 centimeters, the same voltage reading from a long-range sensor may correspond to 40 centimeters. As such, a simple averaging of the voltage readings from each sensor would decrease an accuracy of system 100. It is therefore useful to distinguish what distance range the user's hand is in, in order to determine which sensor's readings to use. However, since the sensor's function is to determine the distance of the hand, it is difficult to determine which sensor range the hand is in without knowing what each sensor is reading.

To solve this problem, multiple linear regression models may be used in motor control system 100. In one embodiment, one model is used to determine the distance of the hand when it is near sensor array 422, and another is used to determine the distance of the hand when it is farther from the sensor array. The short-range model only considers inputs from the short-range sensors and the long-range model only considers inputs from the mid and long range sensors.

For example, system 100 reads the distance predicted or estimated by the short-range model in step 506. In step 508, if the model predicts a distance below a certain threshold, control proceeds to step 512. Otherwise, control proceeds to step 510 to estimate the distance using the long-range model instead.

In step 512, system 100 calculates an output voltage based on the estimated distance. In step 514, if the output voltage is held by system 100, control proceeds to step 518. Otherwise, control proceeds to step 516. In step 518, a current voltage value is compared with a held voltage value. If the current voltage value is greater than or equal to the held voltage value, then control proceeds to step 522. Otherwise, control proceeds to step 520. In step 520, system 100 assigns the held voltage value as the output voltage value for the motor 420.

In step 516, system 100 searches for hand removal. In step 522, if the hand is removed, control proceeds to step 524. Otherwise, control proceeds to step 526. In step 524, system 100 holds the previous or last voltage value, for example, using the knob 118 or by computer-readable instructions executed by control logic 416. In step 526, system 100 assigns the current voltage value as the output voltage value for motor 420. In step 528, system 100 outputs the voltage signal to actuate motor 420, and control returns to step 502.

The above detailed description and the examples described therein have been presented for the purposes of illustration and description only and not for limitation. For example, the operations described can be done in any suitable manner. The methods can be performed in any suitable order while still providing the described operation and results. It is therefore contemplated that the present embodiments cover any and all modifications, variations, or equivalents that fall within the scope of the basic underlying principles disclosed above and claimed herein. Furthermore, while the above description describes hardware in the form of a processor executing code, hardware in the form of a state machine, or dedicated logic capable of producing the same effect, other structures are also contemplated.

What is claimed is:

1. A motor control system for controlling a motor system, the motor control system comprising:
   at least one sensing device attached to a musical instrument and configured to detect movement of an object and generate a sensor signal from the at least one sensing device based on the movement of the object; and
   a control unit comprising:
      a processor connected to the motor system and the at least one sensing device;
      a signal interpretation profile adjustment unit configured to interpret the sensor signal based on a signal interpretation profile; and a motor speed modulation unit configured to generate a motor signal for modulating a speed of the motor system by converting the sensor signal based on the signal interpretation profile.

2. The motor control system of claim 1, wherein the at least one sensing device includes at least one of: a motion-detecting camera, an infra-red sensor, an ultrasound sensor, a motion-tracking camera, and a motion-capturing sensor.

3. The motor control system of claim 1, wherein the control unit further comprises a signal detection and calibration unit configured to detect the sensor signal from at least one sensing device, and provide movement condition information about the object.

4. The motor control system of claim 1, wherein the control unit further comprises a distance estimation unit configured to estimate a distance between a corresponding sensing device and the object based on the sensor signal.

5. The motor control system of claim 1, wherein the control unit further comprises a signal tracking unit configured to track the sensor signal to monitor the movement of the object during a predetermined time period.

6. The motor control system of claim 1, wherein the control unit further comprises a motor activation unit configured to activate the motor system based on the motor signal, and modulate the speed of the motor system based on the motor signal.

7. A method of controlling a motor system, the method comprising:
   detecting, at least one sensing device attached to a musical instrument, movement of an object;
   generating, by the at least one sensing device, a sensor signal based on the movement of the object;
   interpreting, by a control unit, the sensor signal based on a signal interpretation profile; and
   modulating, by the control unit, a speed of the motor system by converting the sensor signal based on the signal interpretation profile.

8. The method of claim 7, further comprising interpreting a relationship associated with at least one of: a distance between the object and the at least one sensing device, and a speed of the object, the relationship being interpreted based on a voltage level of the sensor signal.

9. The method of claim 8, wherein interpreting the relationship comprises estimating the distance between the object and the at least one sensing device based on the voltage level of the sensor signal.

10. The method of claim 7, further comprising detecting the sensor signal from the at least one sensing device and providing movement condition information about the object relative to the at least one sensing device.

11. The method of claim 10, wherein detecting the sensor signal comprises tracking the sensor signal for monitoring the movement condition information of the object during a predetermined time period to evaluate change information of the movement condition.

12. The method of claim 11, wherein tracking the sensor signal comprises calculating a sensor signal strength based on the tracked sensor signal with respect to the change information using the voltage level of the sensor signal.

13. The method of claim 7, further comprising generating a motor signal for modulating the speed of the motor system.

14. The method of claim 13, wherein generating the motor signal comprises activating the motor system based on the motor signal, and modulating the speed of the motor system based on the motor signal.

15. A method of controlling a motor system, the method comprising:
   detecting, by at least one sensing device attached to a musical instrument, movement of an object;
   generating, by the at least one sensing device, a sensor signal based on the movement of the object;
   generating, by a control unit, a signal interpretation profile having movement condition information associated with the object based on a voltage level of the sensor signal;
   interpreting, by the control unit, the sensor signal based on the signal interpretation profile; and
   modulating, by the control unit, a speed of the motor system by converting the sensor signal based on the signal interpretation profile.

16. The method of claim 15, further comprising adjusting the speed of the motor system based on a sensor signal strength of the sensor signal with respect to the signal interpretation profile.

17. The method of claim 16, wherein adjusting the speed of the motor system comprises adjusting the signal interpretation profile to modify at least one of: a range of the at least one sensing device, the sensor signal strength of the sensor signal, and the speed of the motor system.

18. The method of claim 15, further comprising converting the sensor signal based on the signal interpretation profile and generating a motor signal for modulating the speed of the motor system.

* * * * *